(12) United States Patent
Panchetti et al.

(10) Patent No.: US 12,092,218 B2
(45) Date of Patent: Sep. 17, 2024

(54) SEAL ASSEMBLY WITH DEFLECTABLE COUPLER FOR CENTERING A SEALING MEMBER

(71) Applicant: AKTIEBOLAGET SKF, Gothenburg (SE)

(72) Inventors: Marco Erminio Panchetti, Turin (IT); Alex Paykin, Buffalo Grove, IL (US); Gregory G. Gildea, Park City, UT (US); John Arthur Wilkins, Chicago, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 18/102,061

(22) Filed: Jan. 26, 2023

(65) Prior Publication Data
US 2023/0250878 A1 Aug. 10, 2023

(30) Foreign Application Priority Data
Feb. 10, 2022 (IT) .......................... 102022000002381

(51) Int. Cl.
*F16J 15/3232* (2016.01)
(52) U.S. Cl.
CPC ................. *F16J 15/3232* (2013.01)
(58) Field of Classification Search
CPC ... F16J 15/3216; F16J 15/3224; F16J 15/3232
See application file for complete search history.

(56) References Cited

U.S. PATENT DOCUMENTS

| 2,823,966 | A | * | 2/1958 | Reynolds | ................ F16C 33/78 384/489 |
|---|---|---|---|---|---|
| 10,527,173 | B2 | | 1/2020 | Palmer et al. | |
| 2019/0056029 | A1 | | 2/2019 | Palmer et al. | |

FOREIGN PATENT DOCUMENTS

DE 4118382 A1 12/1992

OTHER PUBLICATIONS

Written Opinion and Search Report from the Italian Patent Office mailed Sep. 13, 2022 in related Italian application No. IT20220000238, and translation thereof.

* cited by examiner

*Primary Examiner* — Gilbert Y Lee
(74) *Attorney, Agent, or Firm* — J-TEK LAW PLLC; Scott T. Wakeman; Mark A. Ussai

(57) ABSTRACT

A seal assembly is for sealing between an outer member and an inner member, one of which is rotatable about a central axis. An outer annular case is coupled with the outer member and an inner annular case is disposed within and spaced radially inwardly from the outer case. An annular sealing member is disposed within and coupled with the inner case, the sealing member having a centerline coaxial with the central axis and a sealing lip or lips engaged with the inner member. An annular elastomeric coupler has a first axial end attached to the outer case and a second axial end attached to the inner case. The elastomeric coupler is radially deflectable such that the outer case or inner case is radially displaceable relative to the other one of the two cases while the centerline of the sealing member remains coaxial with the central axis.

12 Claims, 12 Drawing Sheets

SEAL ASSEMBLY WITH DEFLECTABLE COUPLER FOR CENTERING A SEALING MEMBER

CROSS-REFERENCE

This application claims priority to Italian Patent Application No. 102022000002381 filed on Feb. 10, 2022, the entire contents of which are fully incorporated herein by reference.

BACKGROUND OF THE INVENTION

The present invention relates to seals, and more particularly to radial lip seal assemblies.

Radial lip seal assemblies for sealing between a central shaft and an outer member are known and typically include a case mountable within a bore of the outer member (e.g., a housing, a hub, etc.) or about the shaft, and a sealing member attached to the case and having at least one radial sealing lip sealing against the shaft or the bore inner surface. Such seal assemblies are often used to retain lubricant within a bearing coupling the shaft and the outer member and to prevent contaminants or debris from entering the bearing. When there is any substantial radial misalignment between the central axis of the shaft and the centerline of the bore, the sealing lip may not fully engage with the shaft or the bore inner surface, such that lubricant may escape from the bearing or/and contaminants may enter and cause damage to the bearing.

SUMMARY OF THE INVENTION

The present invention is a seal assembly for sealing between an outer member and an inner member, the outer member having an inner surface defining a bore with a centerline and the inner member having a central axis, the outer member or the inner member being rotatable about the central axis. The seal assembly comprises an outer annular case coupled with the outer member and an inner annular case disposed within and spaced radially inwardly from the outer case. An annular sealing member is disposed within and coupled with the inner case, the sealing member having a centerline coaxial with the inner member central axis and at least one sealing lip engaged with the inner member. Further, an annular elastomeric coupler has a first axial end attached to the outer case and a second axial end attached to the inner case, the elastomeric coupler being radially deflectable such that one of the outer case and the inner case is radially displaceable relative to the other one of the outer case and the inner case while the centerline of the sealing member remains coaxial with the central axis of the inner member.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. Nothing disclosed in the drawings should be taken as a representation of performance of any commercial product made generally as described and depicted herein. Also, it should be understood that the present invention is not limited to the precise arrangements and instrumentalities shown. In the drawings.

DETAILED DESCRIPTION OF THE INVENTION

Figure 1:
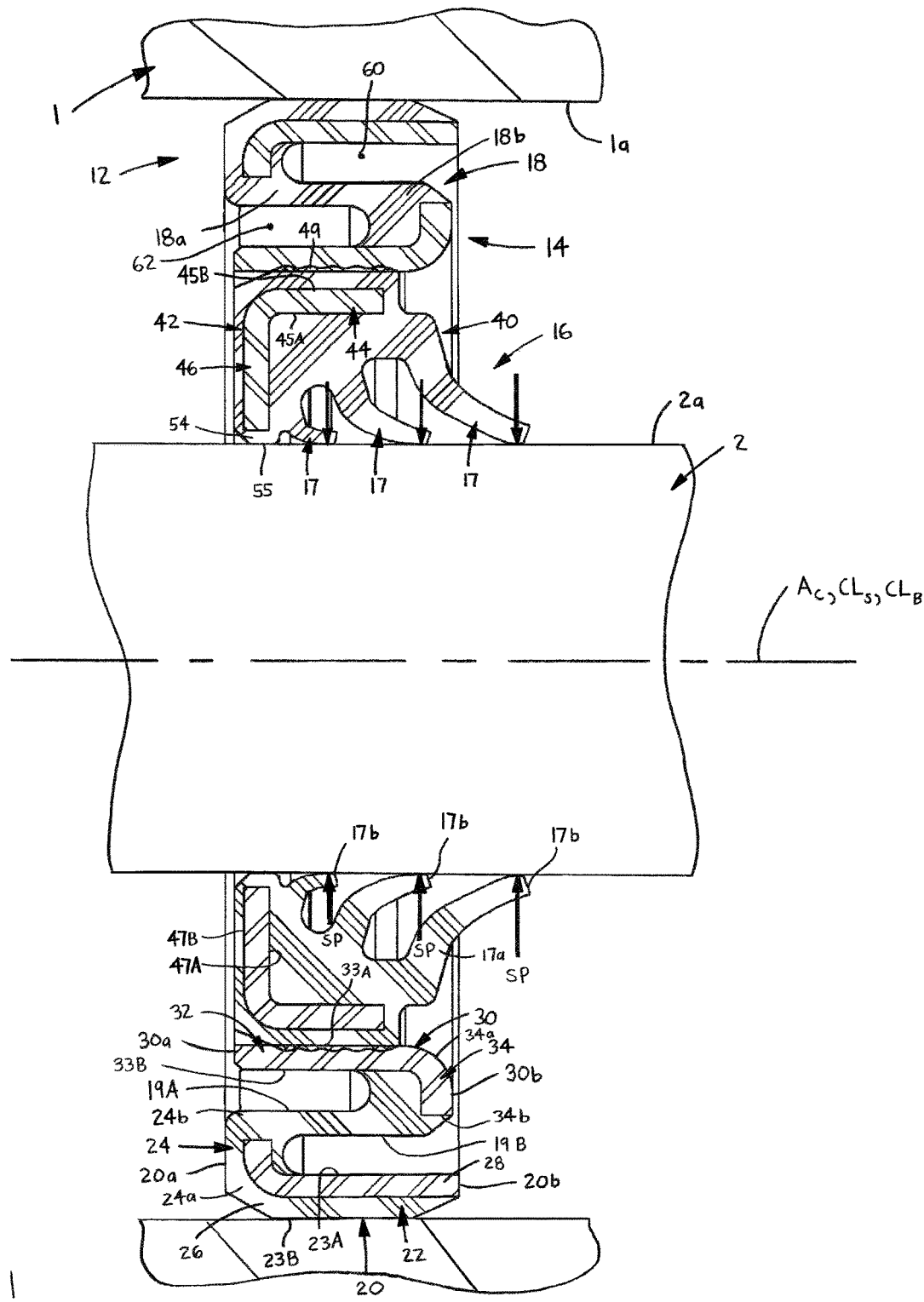
FIG. 1 is an axial cross-sectional view of the sealing member of the present invention, shown installed within an outer member and mounted about an inner member.

Certain terminology is used in the following description for convenience only and is not limiting. The words "lower" and "upper" designate directions in the drawings to which reference is made and the words "inner", "inwardly" and "outer", "outwardly" refer to directions toward and away from, respectively, a designated centerline or a geometric center of an element being described, the particular meaning being readily apparent from the context of the description.

Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 14:
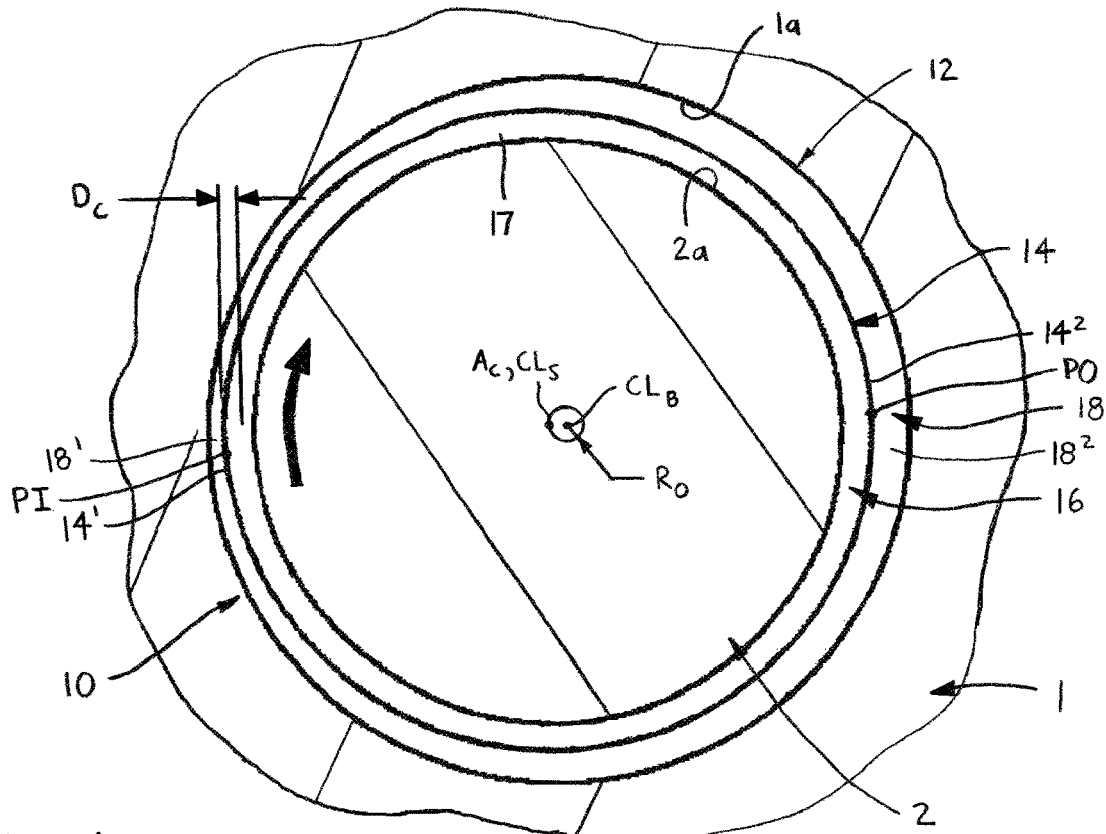
FIG. 14 is a more diagrammatic, radial cross-sectional view of the seal assembly of FIG. 13, showing the rotatable inner member located at a second angular position about the axis ninety degrees from the first angular position.
Figure 15:
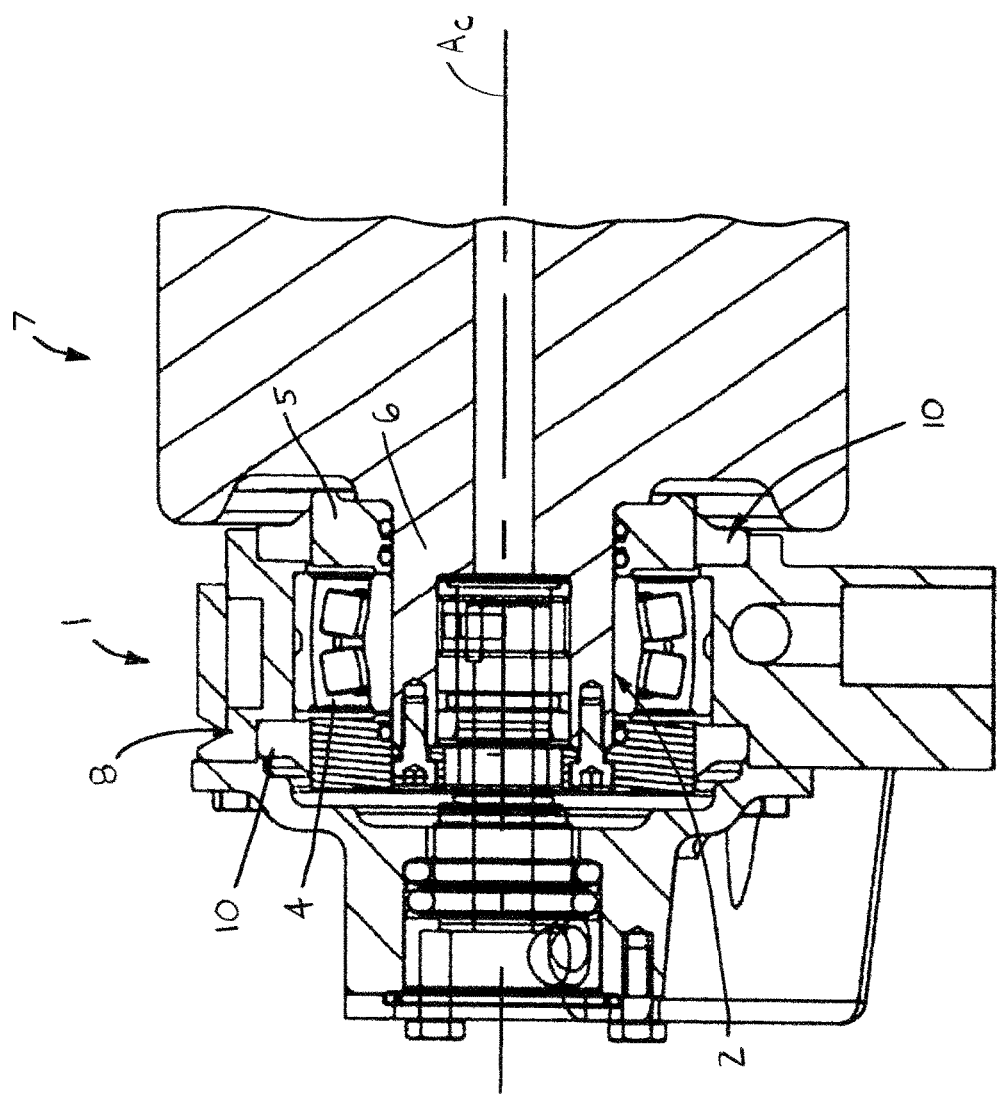
FIG. 15 is a broken-away, axial cross-sectional view of a roll line unit including two of the seal assemblies of the present invention, shown more diagrammatically, in a presently preferred application.

Referring now to the drawings in detail, wherein like numbers are used to indicate like elements throughout, there is shown in FIGS. 1-15 a seal assembly 10 for sealing between an outer member 1 and an inner member 2 and preferably located adjacent to a bearing 4, as depicted in FIG. 15. The outer member 1 has an inner surface 1a defining a bore 3 with a centerline $CL_B$ and the inner member 2 has an outer surface 2a and a central axis $A_C$, and either the outer member 1 or the inner member 2 is rotatable about the central axis $A_C$. Preferably, the inner member 2 is a sleeve 5 disposed about a shaft 6, which is rotatable about the central axis $A_C$, of a roll line unit 7 of a continuous casting machine and the outer member 1 is a support post 8 of the roll line unit 7, as depicted in FIG. 15. Alternatively, the seal assembly 10 may be coupled with a rotatable outer member 1 and seal about a fixed inner member 2. In either case, the seal assembly 10 basically comprises an outer annular case 12, an inner annular case 14, an annular sealing member 16 and an annular elastomeric coupler 18.

More specifically, the outer annular case 12 is coupled with the outer member 1, preferably by frictional engagement as described below, and the inner annular case 14 is disposed within and spaced radially inwardly from the outer case 12. The annular sealing member 16 is disposed within and coupled with the inner case 14, and has a centerline CLs coaxial with the inner member central axis $A_C$ and at least one and preferably a plurality of sealing lips 17 sealingly engaged with the inner member outer surface 2a. Further, the annular elastomeric coupler 18 has inner and outer circumferential surfaces 19A, 19B, a first axial end 18a attached to the outer case 12 and a second axial end 18b attached to the inner case 14, and is configured to movably connect the outer and inner cases 12, 14. Specifically, the elastomeric coupler 18 is radially deflectable such that either the outer case 12 or the inner case 14 is radially displaceable relative to the other one of the outer case 12 and the inner case 14 while the centerline CLs of the sealing member 16 remains coaxial with the central axis $A_C$ of the inner member 2. As such, the sealing pressure SP (FIG. 1) exerted by each one of the sealing lips 17 on the inner member 2 remains constant about the circumferential perimeter of the lip 17, thereby ensuring the sealing integrity of the seal assembly 10.

Figure 13:
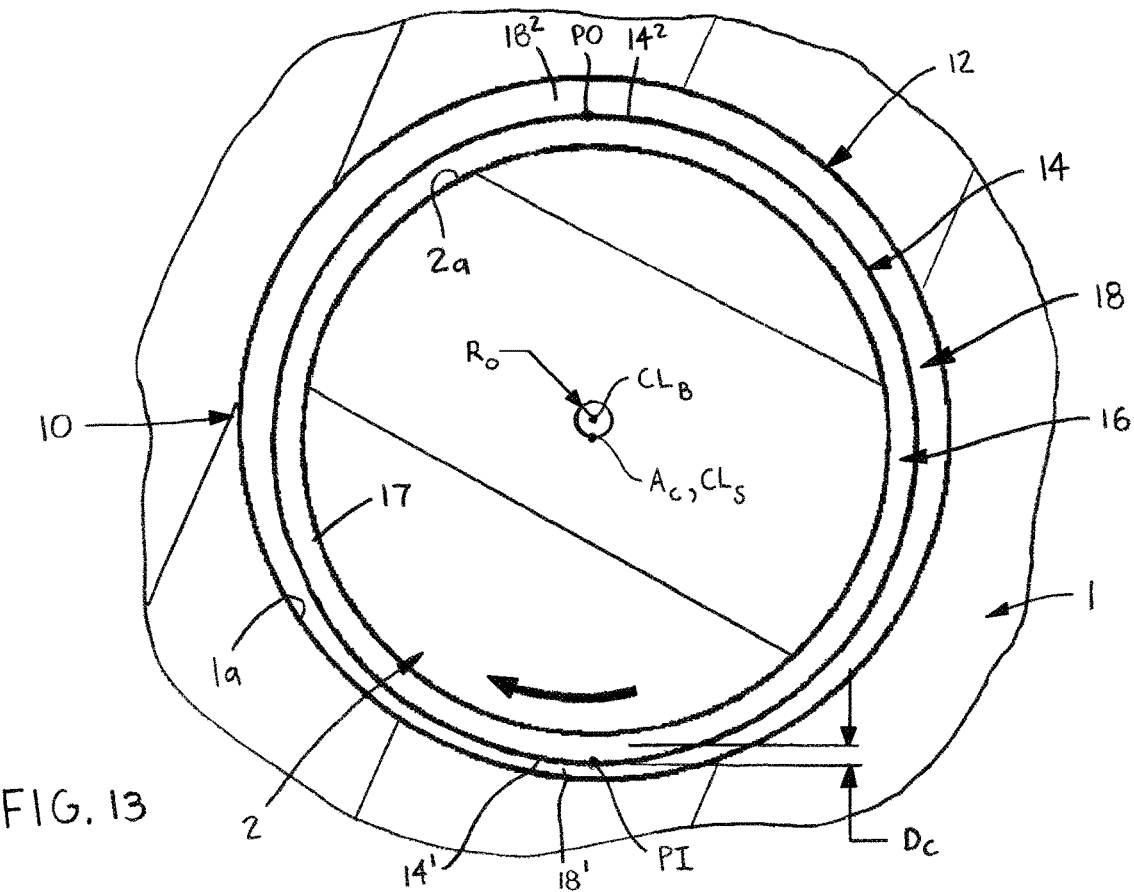
FIG. 13 is a more diagrammatic, radial cross-sectional view of the seal assembly, showing a rotatable inner member offset from the centerline of a fixed bore of the outer member and located at a first angular position about the axis.

Referring to FIGS. 13 and 14, in the presently preferred application in which the outer member 1 is fixed (e.g., a support post, a housing, etc.), the elastomeric coupler 18 radially deflects to permit radial displacement Dc of the inner case 14 relative to the outer case 12 when the inner member 2 angularly displaces about the central axis $A_C$, while the inner member central axis $A_C$ angularly displaces about the bore centerline $CL_B$. That is, when there is a misalignment or radial offset $R_O$ between the inner member 2 and the bore 3 of the fixed outer member 1, the radial deflection of the coupler 18 enables the sealing member 16 to remain centered about the inner member 2 as the inner member 2 angularly displaces about the central axis $A_C$ and within the sealing member 16. In this arrangement, the elastomeric coupler 18 enables continuous radial displacement Dc of various portions of the inner case 14, and thereby also the connected sealing member 16, as the inner member 2 rotates within the bore 3. As such, during rotation of the inner member 2, a radially innermost point PI and a radially outmost point PO of the inner case 14 are each constantly varying about the circumferential perimeter of the inner case 14 as a centerline of the inner case 14 (as well as the coaxial sealing member centerline CLs) angularly displaces about the centerline $CL_B$ of the bore 3 in a circular path having a radius equal to the radial offset $R_O$, as indicated in FIGS. 13 and 14.

Figure 9:
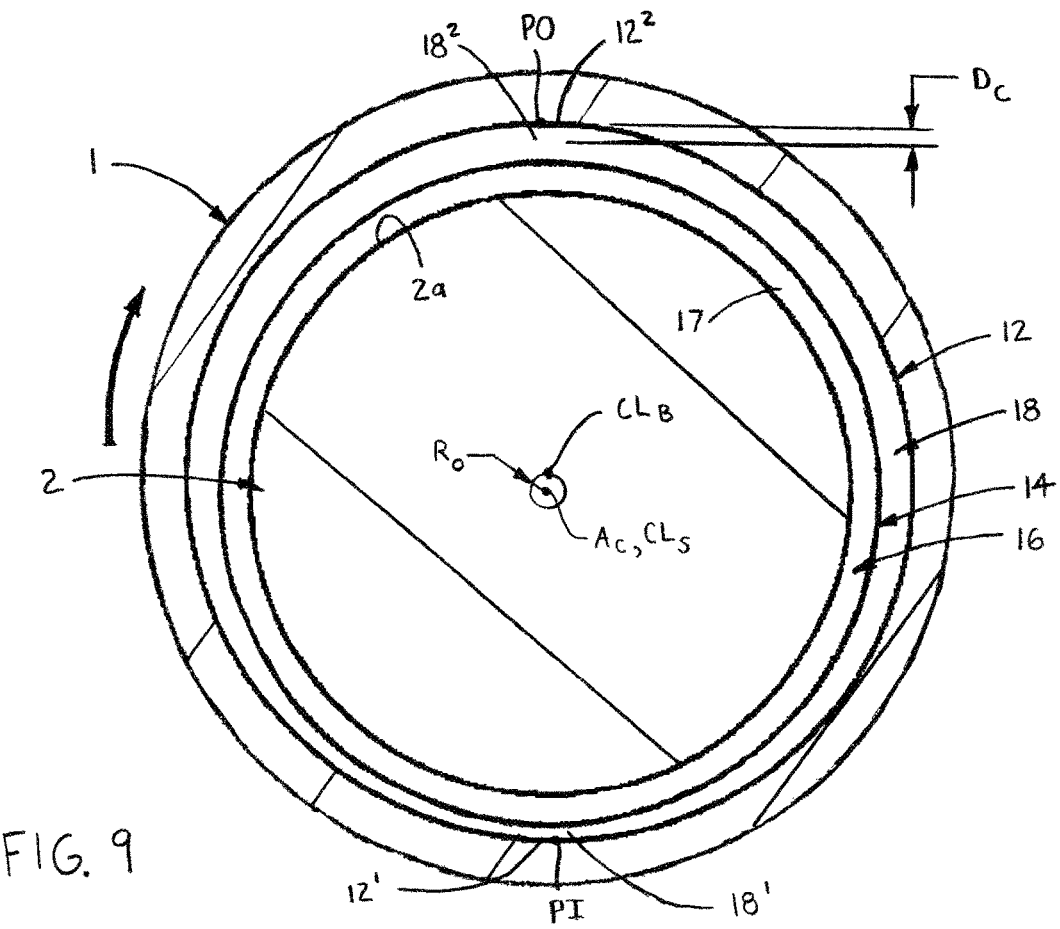
FIG. 9 is a more diagrammatic, radial cross-sectional view of the seal assembly, showing a rotatable outer member offset from a central axis and located at a first angular position about the axis.
Figure 10:
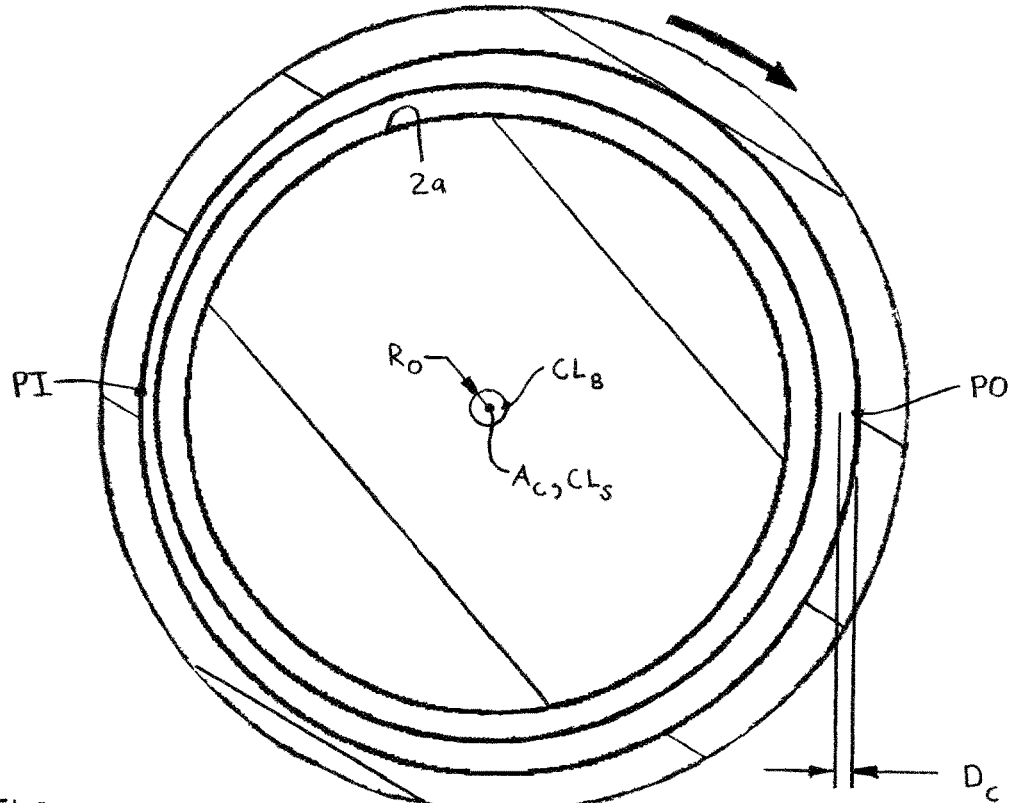
FIG. 10 is a more diagrammatic, radial cross-sectional view of the seal assembly of FIG. 9, showing the rotatable outer member located at second angular position about the axis ninety degrees from the first position.

Referring to FIGS. 9 and 10, in other applications in which the outer member 1 rotates or angularly displaces about the central axis $A_C$, the elastomeric coupler 18 radially deflects to permit radial displacement of the outer case 12 relative to the inner case 14 when the outer member 1 angularly displaces about the inner member central axis $A_C$ while the bore centerline $CL_B$ angularly displaces about the inner member central axis $A_C$. That is, when there is a misalignment or radial offset $R_O$ between the bore centerline $CL_B$ and the central axis $A_C$, and thus between the outer member 1 and the inner member 2, the radial deflection of the coupler 18 enables the sealing member 16 to remain centered about the inner member 2 as the entire seal assembly 10 angularly displaces about the central axis $A_C$ with the coupled outer member 1.

In this arrangement, the elastomeric coupler 18 enables an initial radial displacement Dc of the outer case 12 relative to the inner case 14, which is equal to the radial offset $R_O$, when the seal assembly 10 and outer member 1 are installed about the inner member 2, such that a radially innermost point PI and a radially outermost point PO of outer case 12 relative to the inner case 14 are established, as indicated in each of FIGS. 9 and 10. Thereafter, the entire seal assembly 10 rotates as a unit about the inner member axis $A_C$ (i.e., with the outer member 1), with the bore centerline $CL_B$ angularly displacing about the axis $A_C$ in a circular path having a radius equal to the radial offset $R_O$, without any further relative displacement between the outer and inner cases 12, 14.

Thus, the present seal assembly 10 enables the sealing member 16 to remain centered about the inner member central axis $A_C$, with a constant or nonvarying sealing pressure SP (FIG. 1) about the circumference thereof, whether the outer member 1 or the inner member 2 is rotatable about the central axis $A_C$. Due to the structure of the outer and inner cases 12, 14, and particularly of the elastomeric coupler 18 as described in detail below, the seal assembly 10 is capable of accommodating a substantial radial offset $R_O$ in comparison with previously known seal assemblies. Having described the basic structure and features above, these and other elements of the present sealing assembly 10 are described in further detail below.

Figure 4:
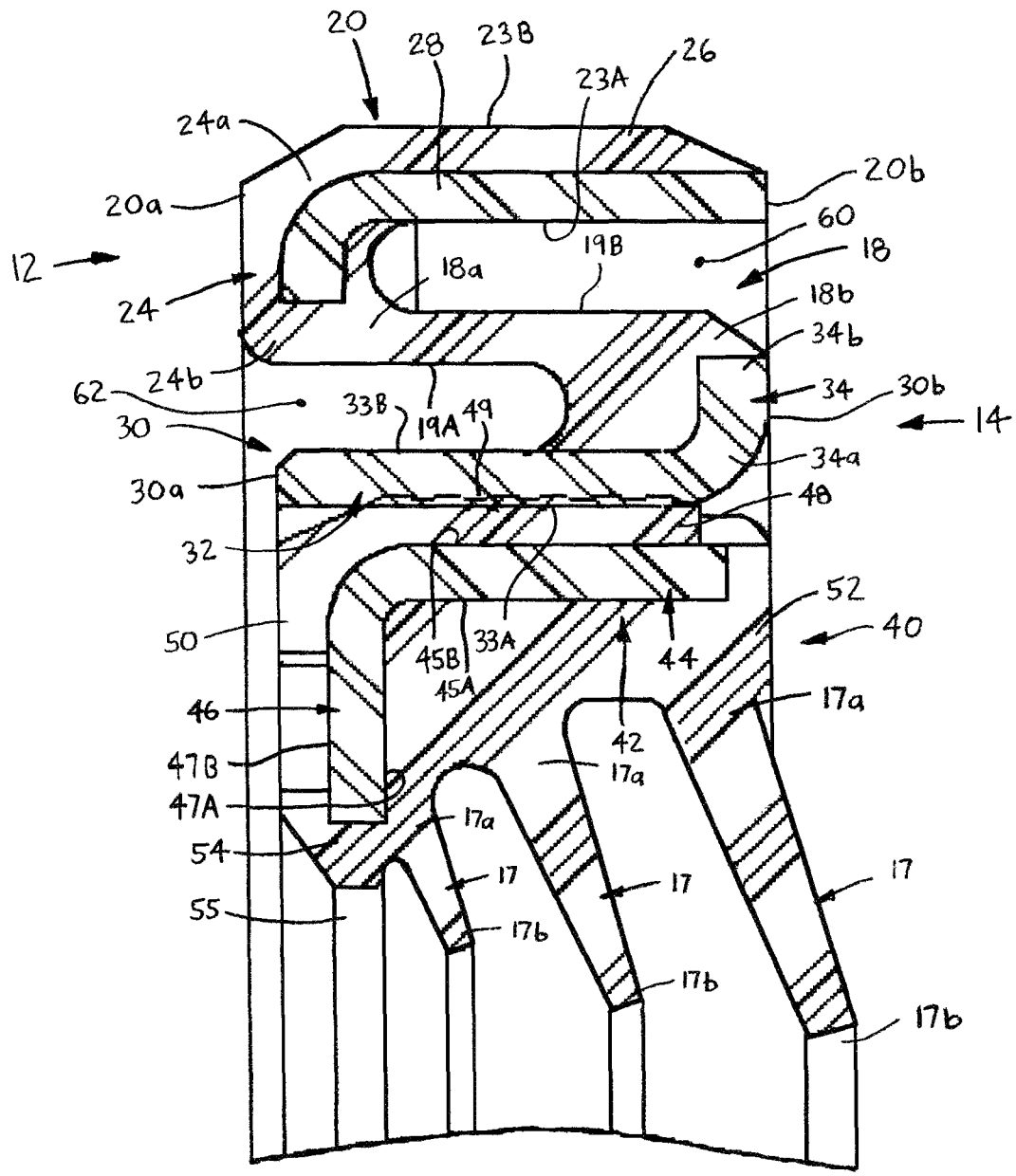
FIG. 4 is an axial cross-sectional view of an upper portion of the seal assembly separate from the outer member and the inner member.
Figures 5, 6:
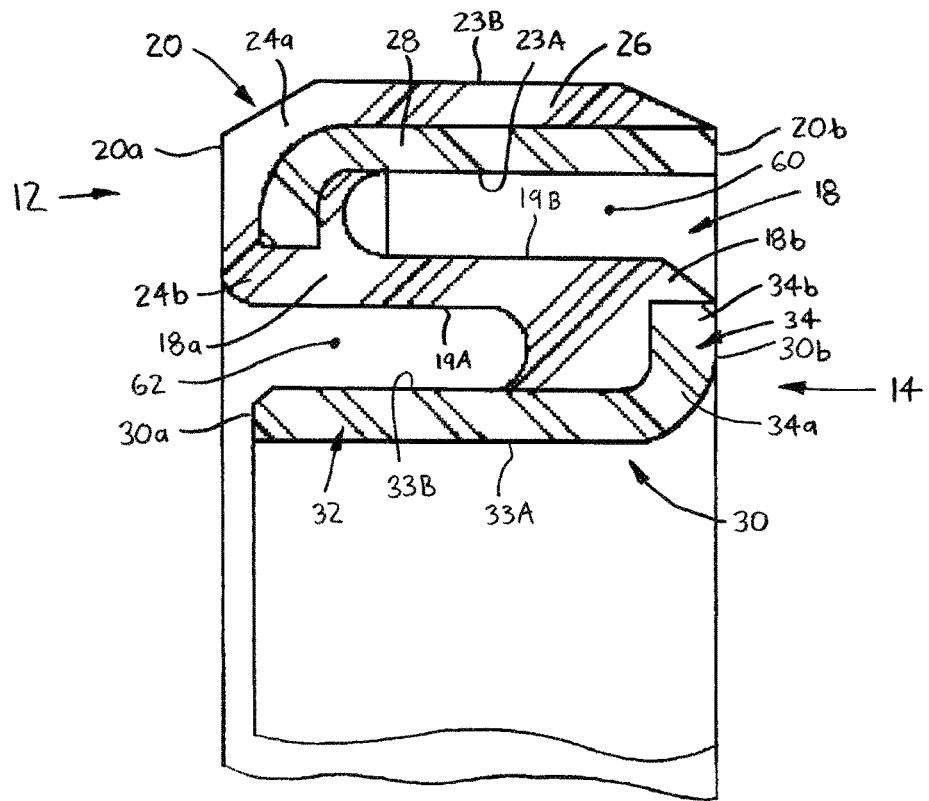
FIG. 5 is an axial cross-sectional view of an outer case, an inner case and a coupler of the seal assembly.
FIG. 6 is an axial cross-sectional view of a sealing member of the seal assembly.

Referring to FIGS. 1, 4 and 5, the outer case 12 includes an annular body 20 with a first axial end 20a and an opposing second axial end 20b. Preferably, the annular body 20 includes a cylindrical portion 22 and a radial flange portion 24 extending radially inwardly from the cylindrical portion 22 at the first axial end 20a. The cylindrical portion 22 is generally tubular and has an inner circumferential surface 23A and an opposing outer circumferential surface 23B, which is frictionally engageable with the outer member inner surface 1a to couple the seal assembly 10 with the outer member 1. Further, the radial flange portion 24 is formed as a generally circular washer with an outer radial end 24a integral with the cylindrical portion 22 and a free inner end 24b.

Preferably, the outer case 22 includes an annular elastomeric portion 26 and an annular rigid portion 28, preferably formed of a metallic material (e.g., low carbon steel, aluminum, etc.), disposed at least partially within the elastomeric portion 26. With this structure, the first axial end 18a of the elastomeric coupler 18 is preferably integrally formed with the elastomeric portion 26 of the outer case 22, but may instead by attached directly to the rigid portion 28. Furthermore, the elastomeric portion 26 of the outer case 12 provides the outer circumferential surface 23B frictionally engageable with the inner surface 1a of the outer member/roll mantle 1, such that the elastomeric portion 26 provides sealing between the outer case 12 and the inner member 1.

Still referring to FIGS. 1, 4 and 5, the inner case 14 includes an annular body 30 with a first axial end 30a and an opposing second axial end 30b. The inner case 14 is disposed within the outer case 12 such that the first axial end 30a is spaced radially inwardly from the first axial end 20a of the outer case 12 and the second axial end 30b is spaced radially inwardly from the second axial end 20b of the outer case 12. Preferably, the annular body 30 of the inner case 14 includes a cylindrical portion 32 extending axially between the first and second axial ends 30a, 30b of the inner case 14 and a radial flange portion 34 extending radially outwardly from the cylindrical portion 32 at the inner case second axial end 30b.

The cylindrical portion 32 is generally tubular and has an inner circumferential surface 33A and an opposing outer circumferential surface 33B, the inner surface 33A being frictionally engageable by the sealing member 16 as discussed below. Further, the radial flange portion 34 is formed as a generally circular washer with an inner radial end 34a integral with the cylindrical portion 32 and a free outer end 34b. Preferably, the outer case 32 is substantially rigid and formed of a metallic material, such as for example, low carbon steel, aluminum, etc., but may be formed of a rigid polymeric material or any other appropriate material.

Referring now to FIGS. 1, 4 and 6, the sealing member 16 preferably includes an annular elastomeric body 40 providing the at least one sealing lip 17 and a rigid annular support member 42 embedded at least partially within the elastomeric body 40. Preferably, the elastomeric body 40 is formed of an elastomeric or polymeric material having a greater stiffness or rigidity than the material of the elastomeric coupler 18, i.e., having a higher durometer, but the body 40 and the coupler 18 may alternatively be formed of the same material. The support member 42 is generally L-shaped and includes an axial portion 44 with opposing inner and outer circumferential surfaces 45A, 45B and a radial portion 46 with inner and outer radial surfaces 47A, 47B.

Further, the elastomeric body 40 is molded about the axial and radial portions 44, 46 such that the elastomeric body 40 has a circumferential portion 48 disposed about the outer circumferential surface 45B of the axial portion 44, a radial portion 50 molded to the outer radial surface 47B of the radial portion 46, and a main body portion 52 molded to both the inner circumferential surface 45A of the axial portion 44 and the inner radial surface 47A of the radial portion 46. The main body portion 52 provides the at least one sealing lip 17, and preferably a plurality of annular sealing lips 17 (most preferably three lips 17) spaced axially apart. Each sealing lip 17 is bendable or deflectable and has a radially outer end 17a integral with a remainder of the body 40 and a radially inner end 17b spaced axially from the lip outer end 17a and sealingly engageable with the inner member 2. Preferably, the sealing member 16 also includes an annular bumper 54 molded on an inner end 46a of the support member radial portion 46 and having an inner circumferential surface 55 spaced radially outward from the outer surface 2a of the inner member 2 by a minimal radial clearance. The bumper 54 functions to "track" the inner member 2 to ensure that the sealing member 16 remains centered about the inner member 2 during relative displacement of the outer and inner cases 12, 14, and also provides a labyrinth sealing function.

With the above structure, the sealing member 16 is preferably removably mounted within the inner case 14 by pressing the sealing member 16 into the inner case 14 such that an outer circumferential surface 49 of the seal body 40 is frictionally engaged with the inner circumferential surface 33A of the inner case cylindrical portion 32. However, the sealing member 16 may alternatively be permanently mounted to the inner case 14, such as by molding the circumferential portion 48 of the elastomeric body 40 to the inner surface 33A of the inner case 14, or removably mounted by other means, such as fasteners, etc.

Referring now to FIGS. 1, 4 and 5, with above-described structure of the outer and inner cases 12, 14, the first axial end 18a of the elastomeric coupler 18 is attached to the first axial end 20a of the outer case annular body 20 and the second axial end 18b of the coupler 18 is attached to the second axial end 30b of the inner case annular body 30. More specifically, the coupler first end 18a is preferably attached to the inner end 24b of the radial flange portion 24 of the outer case 12 and the coupler second end 18b is preferably attached to the outer end 34b of radial flange portion 34 of the inner case 14. Further, the outer circumferential surface 19B of the coupler 18 is spaced radially inwardly from the outer case 12 so as to define an outer annular channel 60 and the coupler inner circumferential surface 19A is spaced radially outwardly from the inner case 14 so as to define an inner annular channel 62. The outer channel 60 and the inner channel 62 provide clearance for relative radial displacement between a section of the outer case 12 and a section of the inner case 14, as described in further detail below.

Due to the two axial ends 18a, 18b of the annular coupler 18 being attached to opposite axial ends 20a, 30b of the outer and inner cases 12, 14, respectively, the elastomeric coupler 18 enables a substantial amount of relative radial displacement between the outer and inner cases 12, 14 for a given axial length of the cases 12, 14. As such, the seal assembly 10 is able to accommodate a significant amount of radial offset $R_O$ between the inner member axis $A_C$ and the bore centerline $CL_B$ while minimizing the axial space required for the seal assembly 10.

Figure 2:
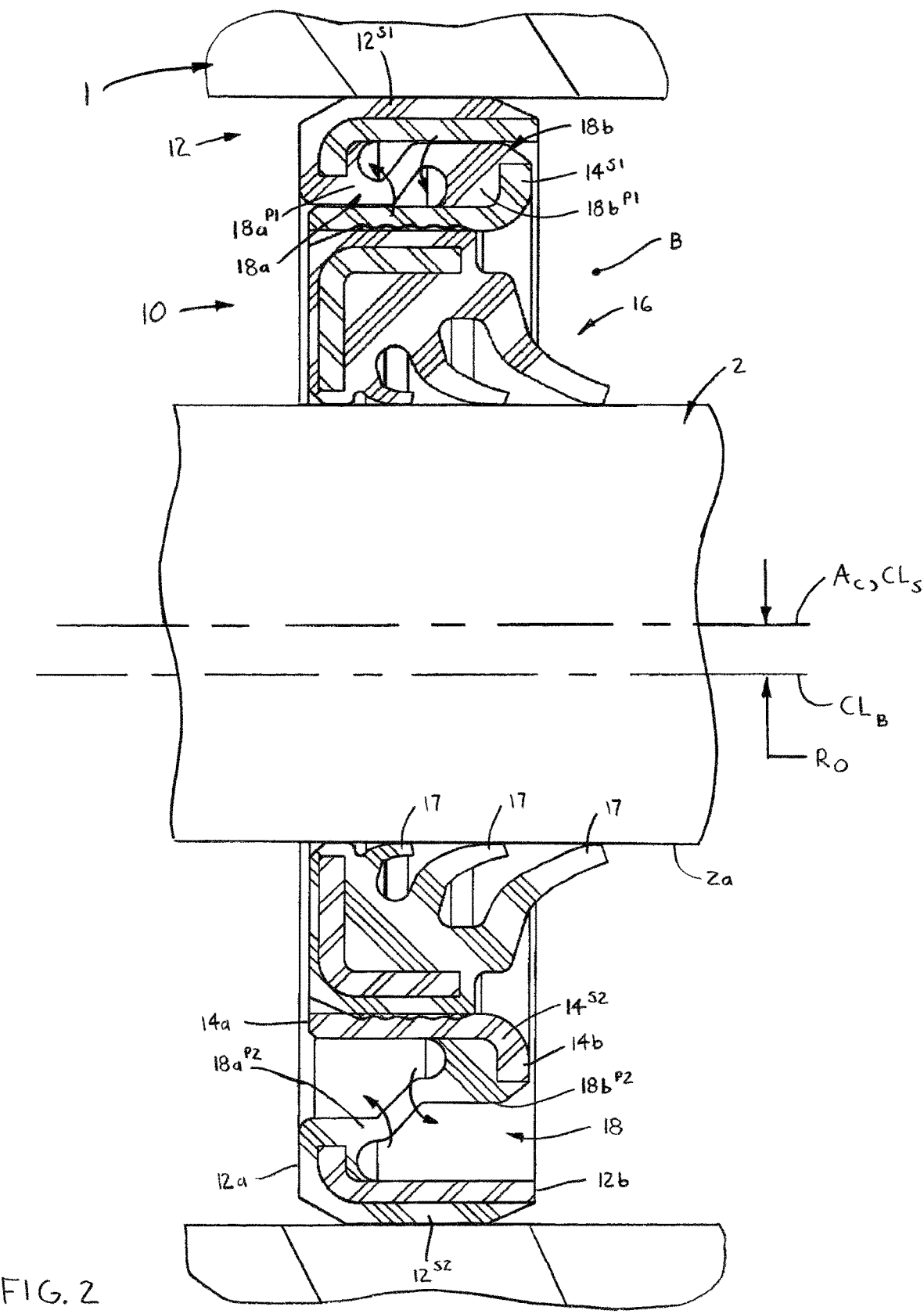
FIG. 2 is another axial cross-sectional view of the sealing assembly, shown installed within a rotatable outer member radially offset from a fixed inner member.
Figure 3:
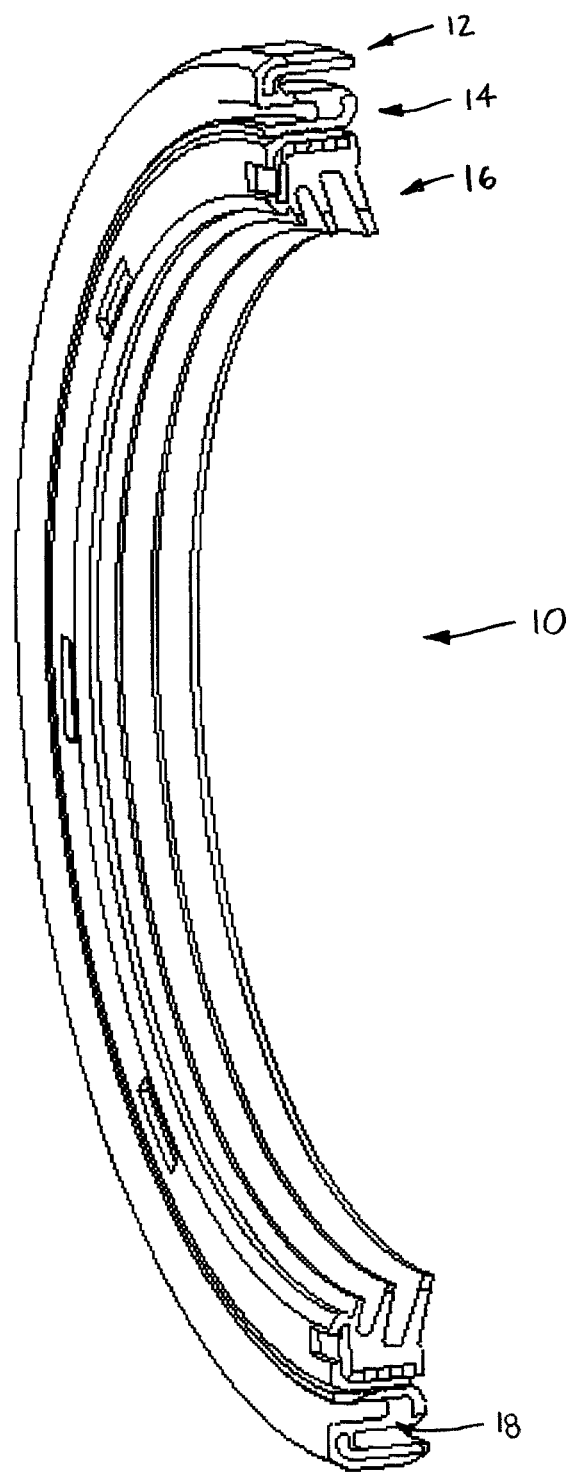
FIG. 3 is broken-away perspective view of the seal assembly, shown separate from the outer member and the inner member.

Referring particularly to FIG. 2, the elastomeric coupler 18 bends or deflects as follows to enable relative radial displacement between the outer and inner cases 12, 14 while maintaining the sealing member 16 centered about the inner member 2 with a constant sealing pressure. When a section $12^{S1}$ of the outer case 12 attached to a portion $18a^{P1}$ of the coupler first axial end 18a, or a section $14^{S1}$ of the inner case 14 attached to a portion $18b^{P1}$ of the coupler second axial end 18b, displaces radially toward the other one of the inner case section $14^{S1}$ or the outer case section $12^{S1}$, the portion $18a^{P1}$ of the first axial end 18a of the elastomeric coupler 18 bends radially outwardly and the portion $18b^{P1}$ of the second axial end 18b of the elastomeric coupler 18 bends radially inwardly, as shown in the upper half of FIG. 2. Also, when a section $12^{S2}$ of the outer case 12 attached to a portion $18a^{P2}$ of the coupler first axial end 18a, or a section $14^{S2}$ of the inner case 14 attached to a portion $18b^{P2}$ of the coupler second axial end 18b, displaces radially away from the other one of the inner case section $14^{S2}$ and the outer case section $12^{S2}$, the portion $18a^{P2}$ of the first axial end $18a$ of the elastomeric coupler 18 bends radially inwardly and the portion $18b^{P2}$ of the second axial end $18b$ of the elastomeric coupler 18 bends radially outwardly, as shown in the lower half of FIG. 2.

Figure 11:
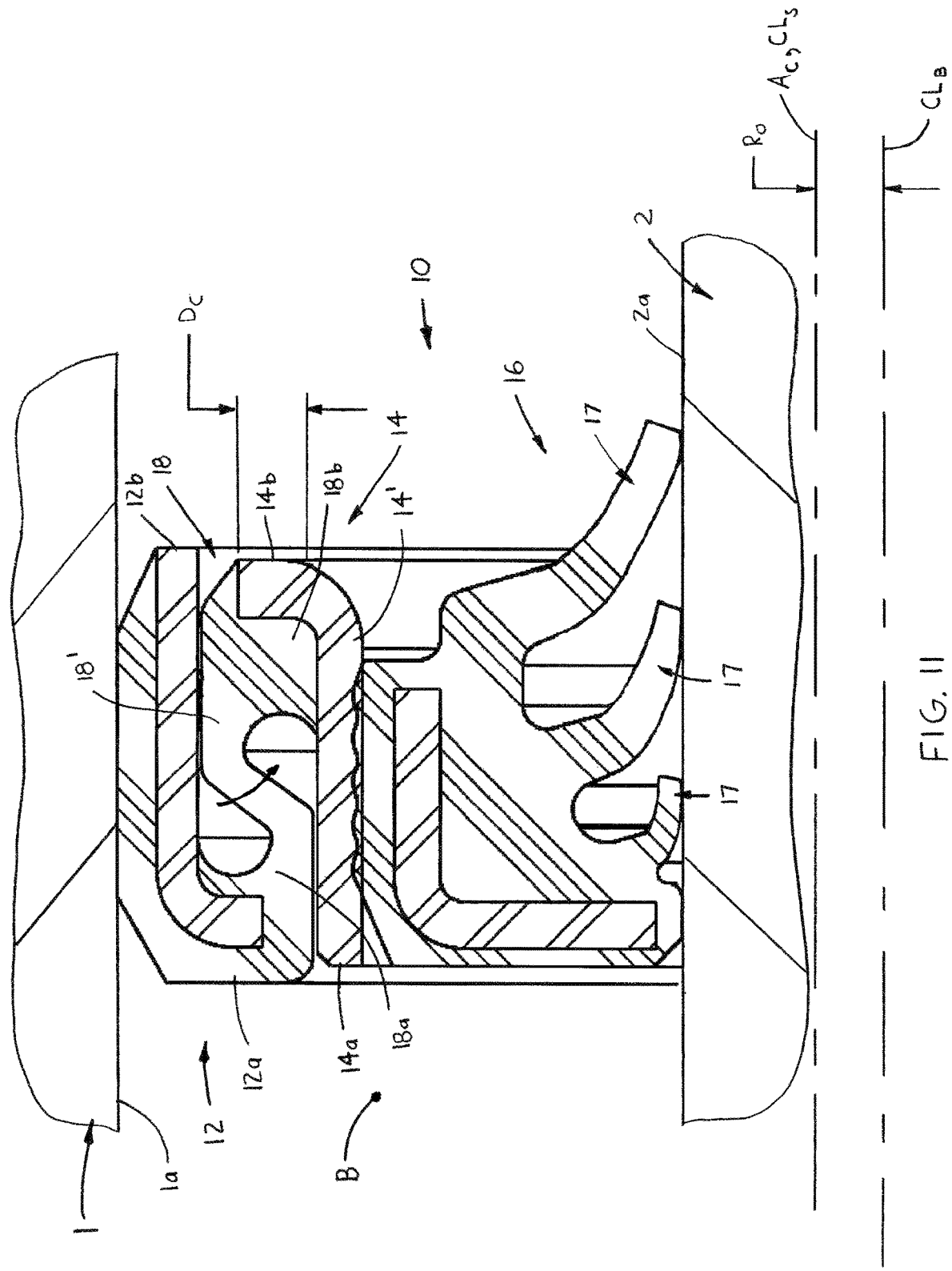
FIG. 11 is an enlarged, broken-away axial cross-sectional view of the seal assembly shown installed within a fixed outer member and mounted about a rotatable inner member and with the inner and outer cases in a minimally separated configuration.
Figure 12:
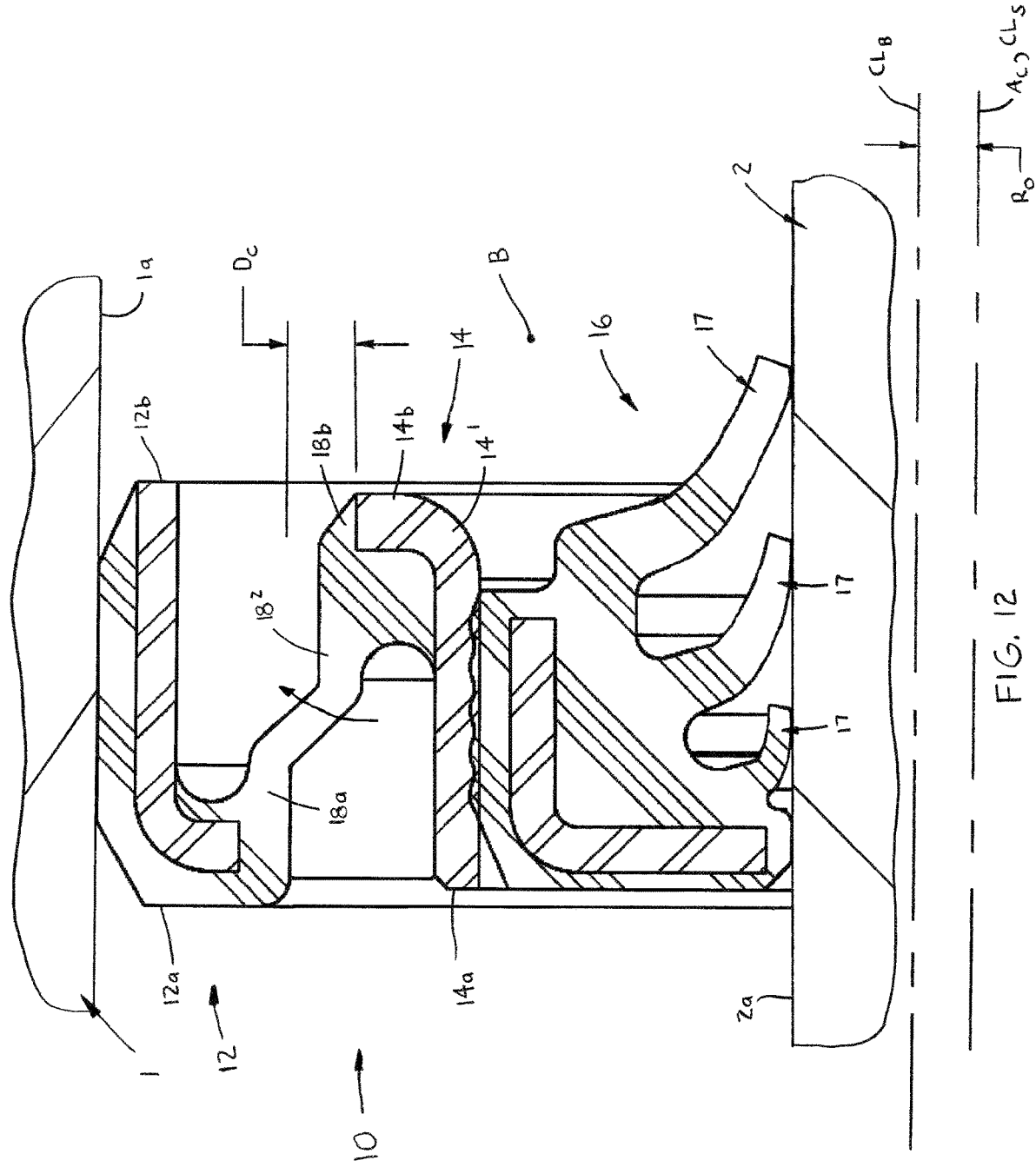
FIG. 12 is an enlarged, broken-away axial cross-sectional view of the seal assembly of FIG. 11, showing the inner and outer cases in a maximally separated configuration.

Further, as the two cases 12, 14 are annular, any radial displacement of a first section $12^1$, $14^1$ of either case 12 or 14 results in an equal displacement, but in an opposing radial direction, of a second section $12^2$, $14^2$ of the case 12 or 14 spaced one hundred eighty degrees (180°) about the central axis $A_C$ from the first case section $12^1$, $14^1$. Specifically, when there is a radial offset $R_O$ between a rotatable inner member 2 and a fixed outer member 1, a first portion $18^1$ of the elastomeric coupler 18 attached to the inner case 14 is bendable radially inwardly toward the inner case 14 so as to displace a first section $14^1$ of the inner case 14 radially outwardly toward the outer case 12, as depicted in FIGS. 11, 13 and 14. Simultaneously, a second portion $18^2$ of the coupler 18 spaced about one hundred eighty degrees (180°) from the first portion $18^1$ of the coupler 18 is bendable radially outwardly away from the inner case 14 so as to displace a second section $14^2$ of the inner case 14, spaced about one hundred eighty degrees (180°) from the first section $14^1$ of the inner case 14, radially inwardly away from the outer case 12, as depicted in FIGS. 12-14.

Figure 7:
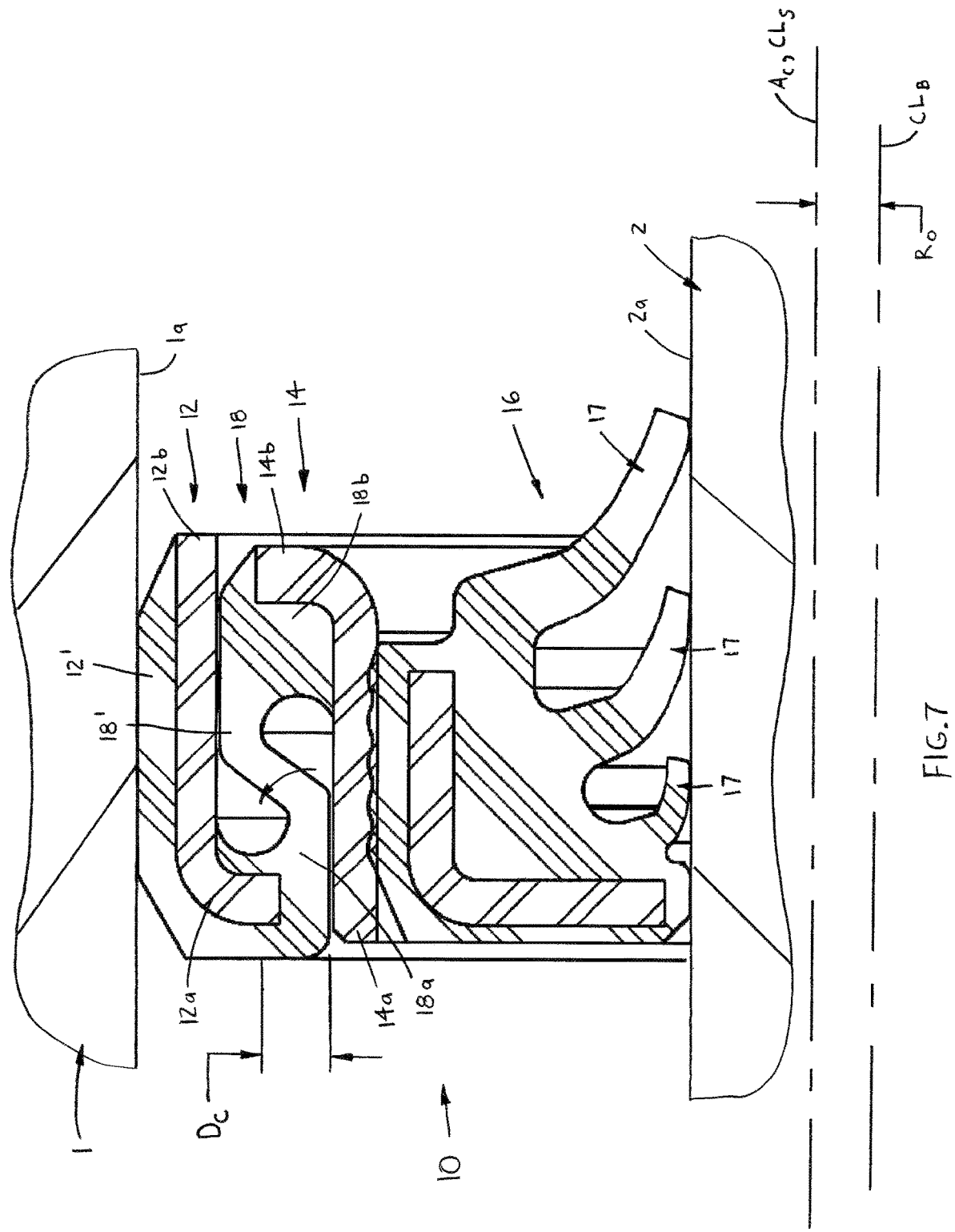
FIG. 7 is an enlarged, broken-away axial cross-sectional view of the seal assembly shown installed within a rotatable outer member and mounted about a fixed inner member and with the inner and outer cases in a minimally separated configuration.
Figure 8:
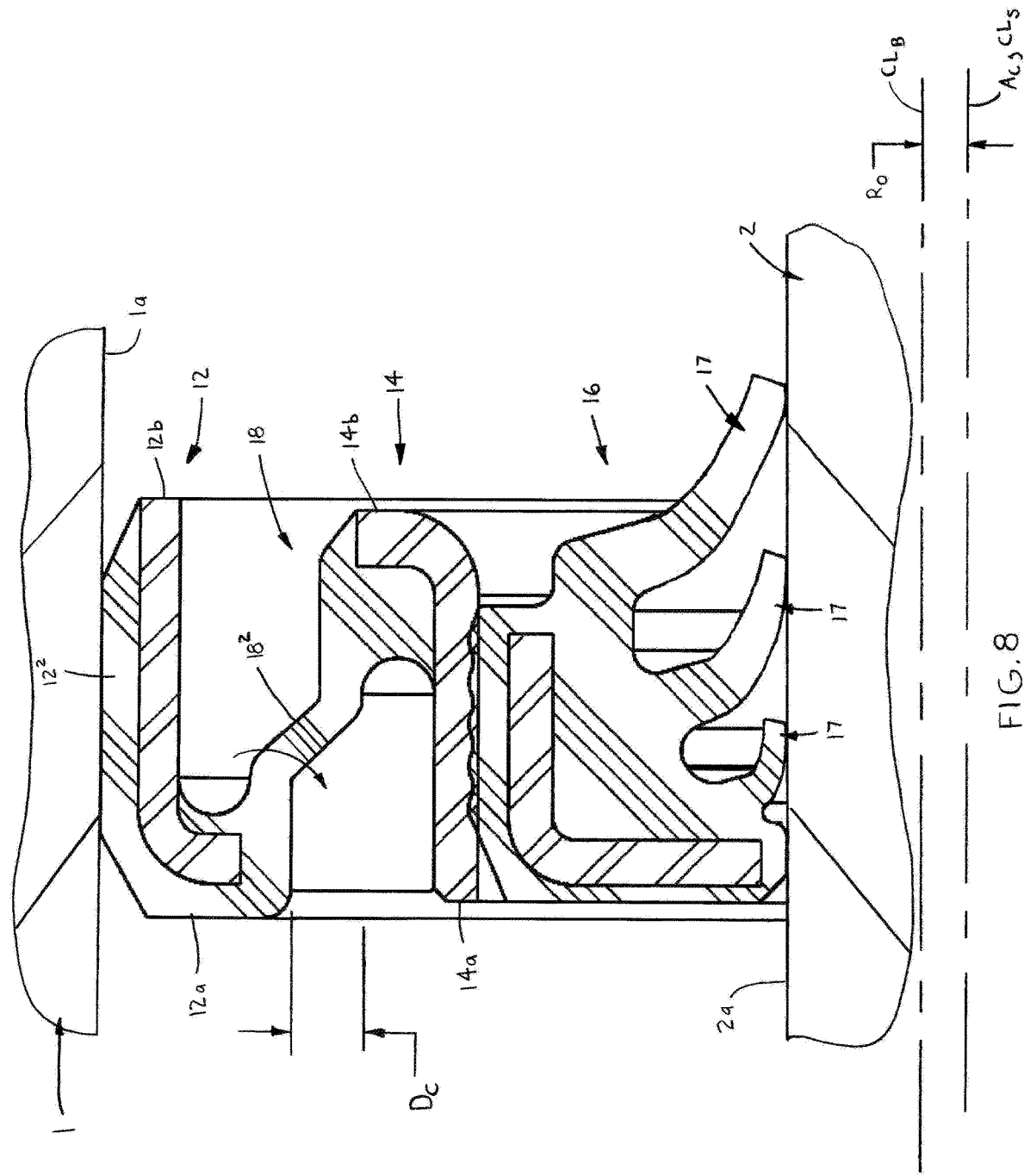
FIG. 8 is an enlarged, broken-away axial cross-sectional view of the seal assembly of FIG. 7, shown with the inner and outer cases in a maximally separated configuration.

Alternatively, when there is a radial offset $R_O$ between a rotatable outer member 1 and a fixed central inner member 2, a first portion $18^1$ of the elastomeric coupler 18 attached to the outer case 12 is bendable radially outwardly toward the outer case 12 so as to displace a first section $12^1$ of the outer case 12 radially inwardly toward the inner case 14 by a radial displacement Dc equal to the radial offset $R_O$, as shown in FIGS. 7, 9 and 10. Simultaneously, a second portion $18^2$ of the coupler 18 attached to the outer case 12, and spaced about one hundred eighty degrees (180°) from the first portion $18^1$ of the coupler 18, is bendable radially inwardly away from the outer case 12 so as to displace a second section $12^2$ of the outer case 12, spaced about one hundred eighty degrees (180°) from the first section $12^1$ of the outer case 12, radially inwardly away from the inner case 12, as shown in FIGS. 8-10.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A seal assembly for sealing between an outer member and an inner member, the outer member having an inner surface defining a bore with a centerline and the inner member having a central axis, the outer member or the inner member being rotatable about the central axis, the seal assembly comprising:
   an outer annular case coupled with the outer member;
   an inner annular case disposed within and spaced radially inwardly from the outer case;
   an annular sealing member disposed within and coupled with the inner case, the sealing member having a centerline coaxial with the inner member central axis and at least one sealing lip engaged with the inner member; and
   an annular elastomeric coupler having a first axial end, a second axial end spaced axially apart from the first axial end and a central portion extending axially between the first axial end and the second axial end in an undeflected state, the coupler being connected to the outer case solely by the first axial end of the coupler and connected to the inner case solely by the second axial end of the coupler, the central portion of the elastomeric coupler being radially deflectable such that one of the outer case and the inner case is radially displaceable relative to the other one of the outer case and the inner case while the centerline of the sealing member remains coaxial with the central axis of the inner member.

2. The seal assembly as recited in claim 1 wherein one of:
   the central portion of the elastomeric coupler radially deflects to permit radial displacement of the outer case relative to the inner case when the outer member angularly displaces about the inner member central axis while the bore centerline angularly displaces about the central axis; and
   the central portion of the elastomeric coupler radially deflects to permit radial displacement of the inner case relative to the outer case when the inner member angularly displaces about the central axis while the central axis angularly displaces about the bore centerline.

3. The seal assembly as recited in claim 1 wherein:
   the outer case has a first axial end and an opposing second axial end;
   the inner case has a first axial end spaced radially inwardly from the first axial end of the outer case and an opposing second axial end spaced radially inwardly from the second axial end of the outer case; and
   the first axial end of the elastomeric coupler is attached to the first axial end of the outer case and the second axial end of the elastomeric coupler is attached to the second axial end of the inner case.

4. The seal assembly as recited in claim 3 wherein:
   the outer case includes a cylindrical portion extending axially between the first and second axial ends of the outer case and a radial flange portion extending radially inwardly from the cylindrical portion at the outer case first axial end;
   the inner case includes a cylindrical portion extending axially between the first and second axial ends of the inner case and a radial flange portion extending radially outwardly from the cylindrical portion at the inner case second axial end; and the first axial end of the elastomeric coupler is attached to the flange portion of the outer case and the second axial end of the elastomeric coupler is attached to the flange portion of the inner case.

5. The seal assembly as recited in claim 3 wherein:

a portion of the first axial end of the elastomeric coupler bends radially outwardly and a portion of the second axial end of the elastomeric coupler bends radially inwardly when a section of the outer case attached to the portion of the coupler first axial end or a section of the inner case attached to the portion of the coupler second axial end displaces radially toward the other one of the section of the inner case and the section of the outer case; and a portion of the first axial end of the elastomeric coupler bends radially inwardly and a portion of the second axial end of the elastomeric coupler bends radially outwardly when a section of the outer case attached to the portion of the coupler first axial end or a section of the inner case attached to the portion of the coupler second axial end displaces radially away from the other one of the section of the inner case and the section of the outer case.

6. The seal assembly as recited in claim 1 wherein the elastomeric coupler has an outer circumferential surface spaced radially inwardly from the outer case so as to define an outer annular channel and an inner circumferential surface spaced radially outwardly from the inner case so as to define an inner annular channel, the outer channel and the inner channel providing clearance for relative radial displacement between a section of the outer case and a section of the inner case.

7. The seal assembly as recited in claim 1 wherein:

a first portion of the central portion of the elastomeric coupler attached to the outer case is bendable radially outwardly toward the outer case so as to displace a first portion of the outer case radially inwardly toward the inner case while a second portion of the central portion of the coupler attached to the outer case and spaced about one hundred eighty degrees from the first portion of the coupler is bendable radially inwardly away from the outer case so as to displace a second portion of the outer case spaced about one hundred eighty degrees from the first portion of the outer case radially inwardly away from the inner case; or a first portion of the central portion of the elastomeric coupler attached to the inner case is bendable radially inwardly toward the inner case so as to displace a first portion of the inner case radially outwardly toward the outer case while a second portion of the central portion of the coupler spaced about one hundred eighty degrees from the first portion of the coupler is bendable radially outwardly away from the inner case so as to displace a second portion of the inner case spaced about one hundred eighty degrees from the first portion of the inner case radially inwardly away from the outer case.

8. The seal assembly as recited in claim 1 wherein the sealing member includes an annular elastomeric body providing the at least one sealing lip and a rigid annular support member embedded at least partially within the elastomeric body.

9. The seal assembly as recited in claim 8 wherein at least one of:

the inner case has an inner circumferential surface and the elastomeric body of the sealing member includes an outer circumferential surface frictionally engageable with the inner circumferential surface of the inner case to couple the sealing member with the inner case; and the elastomeric body of the seal includes a plurality of annular sealing lips spaced axially apart, each sealing lip being bendable and having a radially outer end integral with a remainder of the body and a radially inner end spaced axially from the outer end and sealingly engageable with the inner member, and/or an annular bead with an inner circumferential surface engageable with the inner member.

10. The seal assembly as recited in claim 1 wherein the outer case includes an annular elastomeric portion and an annular rigid portion disposed at least partially within the elastomeric portion, the first axial end of the elastomeric coupler being integrally formed with the elastomeric portion of the outer case.

11. The seal assembly as recited in claim 1, wherein:

the central portion of the elastomeric coupler has an outer circumferential surface spaced radially inwardly from the outer case and an inner circumferential surface spaced radially inwardly from the outer circumferential surface of the central portion and spaced radially outwardly from the inner case;

the first axial end of the elastomeric coupler includes an annular shoulder extending radially outwardly with respect to the outer circumferential surface of the central portion and attached to the outer case; and the second axial end of the elastomeric coupler includes an annular shoulder extending radially inwardly with respect to the inner circumferential surface of the central portion, spaced axially apart from the annular shoulder of the first axial end, and attached to the inner case.

12. A seal assembly for sealing between an outer member and an inner member, the outer member having an inner surface defining a bore with a centerline and the inner member having a central axis, the outer member or the inner member being rotatable about the central axis, the seal assembly comprising:

an outer annular case coupled with the outer member;

an inner annular case disposed within and spaced radially inwardly from the outer case;

an annular sealing member disposed within and coupled with the inner case, the sealing member having a centerline coaxial with the inner member central axis and at least one sealing lip engaged with the inner member; and an annular elastomeric coupler having a first axial end, a second axial end spaced axially apart from the first axial end and a cylindrical central portion extending axially between the first axial end and the second axial end, the central portion having an outer circumferential surface spaced radially inwardly from the outer case and an inner circumferential surface spaced radially inwardly from the outer circumferential surface of the central portion and spaced radially outwardly from the inner case, the first axial end including an annular shoulder extending radially outwardly with respect to the outer circumferential surface of the central portion and being attached to the outer annular case, the second axial end including an annular shoulder extending radially inwardly with respect to the inner circumferential surface of the central portion, spaced axially apart from the annular shoulder of the first axial end and attached to the inner annular case.

* * * * *